US012612896B2

(12) United States Patent
Chung

(10) Patent No.: US 12,612,896 B2
(45) Date of Patent: Apr. 28, 2026

(54) WIND POWER GENERATION STRUCTURE AND METHOD FOR VERTIPORT

(71) Applicants: Hyundai Motor Company, Seoul (KR); Kia Corporation, Seoul (KR)

(72) Inventor: Jae Hoon Chung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/966,023

(22) Filed: Dec. 2, 2024

(65) Prior Publication Data

US 2025/0305482 A1 Oct. 2, 2025

(30) Foreign Application Priority Data

Mar. 27, 2024 (KR) ........................ 10-2024-0041696

(51) Int. Cl.
*F03D 9/43* (2016.01)
*B64F 1/36* (2024.01)

(52) U.S. Cl.
CPC ................. *F03D 9/43* (2016.05); *B64F 1/36* (2013.01); *F05B 2240/911* (2013.01)

(58) Field of Classification Search
CPC ... B64F 1/22; B64F 1/36; B64F 1/007; B64U 70/90; B64U 70/97; F03D 9/43; H02K 7/183; F05B 2240/9113; F05B 2240/911
See application file for complete search history.

(56) References Cited

U.S. PATENT DOCUMENTS

| | | | | | |
|---|---|---|---|---|---|
| 5,998,882 | A | * | 12/1999 | Alston | F03D 9/22 |
| | | | | | 60/226.1 |
| 7,380,751 | B1 | * | 6/2008 | Henson | F03D 9/12 |
| | | | | | 244/1 R |
| 9,046,076 | B1 | * | 6/2015 | Al Salameh | F03D 9/25 |
| 9,359,997 | B2 | * | 6/2016 | Toh | F03D 9/00 |
| 11,535,989 | B2 | | 12/2022 | Sarpotdar et al. | |
| 11,952,147 | B2 | * | 4/2024 | Kwon | B64U 80/84 |
| 12,352,246 | B2 | * | 7/2025 | Naganna | G05B 15/02 |
| 2010/0276940 | A1 | | 11/2010 | Khavari et al. | |
| 2018/0226860 | A1 | * | 8/2018 | Glatfelter | H02K 7/1823 |
| 2018/0283357 | A1 | | 10/2018 | Souryal | |
| 2021/0032820 | A1 | * | 2/2021 | Sarpotdar | B64F 1/26 |
| 2021/0237863 | A1 | | 8/2021 | Stumpf | |
| 2022/0153406 | A1 | | 5/2022 | Kang et al. | |
| 2023/0211681 | A1 | | 7/2023 | Kim | |

FOREIGN PATENT DOCUMENTS

| | | | |
|---|---|---|---|
| KR | 10-2017-0061865 | A | 6/2017 |
| KR | 10-2021-0143448 | A | 11/2021 |
| KR | 102352968 | B1 | 1/2022 |
| KR | 10-2022-0075468 | A | 6/2022 |
| KR | 10-2023-0103634 | A | 7/2023 |

OTHER PUBLICATIONS

May 7, 2025—European Search Report—App 24217098.3.

* cited by examiner

*Primary Examiner* — Arfan Y. Sinaki
(74) *Attorney, Agent, or Firm* — Banner & Witcoff, Ltd.

(57) ABSTRACT

A wind power generation structure for a vertiport includes a takeoff-and-landing deck and a plurality of duct structures provided along an edge of the takeoff-and-landing deck. Each duct structure of the plurality of duct structures individually has a wind turbine and is individually rotatable in a vertical direction.

19 Claims, 11 Drawing Sheets

300

| DUCT STRUCTURE | 310(130,230) |
| CONTROLLER | 320 |
| STORAGE UNIT | 330 |
| COMMUNICATION UNIT | 340 |
| BATTERY | 350 |

1

WIND POWER GENERATION STRUCTURE AND METHOD FOR VERTIPORT

CROSS-REFERENCE TO RELATED APPLICATION(S)

This application claims benefit of priority to Korean Patent Application No. 10-2024-0041696 filed on Mar. 27, 2024 in the Korean Intellectual Property Office, the disclosure of which is incorporated herein by reference in its entirety.

TECHNICAL FIELD

The present disclosure relates to a wind power generation structure for a vertiport, and a wind power generation method for a vertiport using the same.

BACKGROUND

Conventionally, daily use vehicles (e.g., cars, trucks, vans, buses, etc.) move on the ground, and so it is easy to provide stops or platforms for such ground-based vehicles.

However, with the emergence of urban air mobility (UAM), it is urgent to provide stops for vertical taking off and landing mobility device. Stops for the UAM may be often installed in complex urban regions, especially on rooftops of buildings.

In addition, due to the nature of the mobility device, continuous monitoring and management of the mobility device are required during takeoff-and-landing at any such stops, and a large amount of electric and/or man power may be consumed to maintain a field for takeoff-and-landing provided on a rooftop.

In addition, demand for eco-friendly renewable energy continues to increase, but it is difficult to install large-sized wind power generators in large cities in which power consumption is the highest. Accordingly, increasing energy independence and establishing a distributed power source system using smaller-scaled power generation, such as solar power generation and/or small-sized wind power generation is needed.

The matters described in this Background section are only for enhancement of understanding of the background of the disclosure, and should not be taken as acknowledgement that they correspond to prior art already known to those skilled in the art.

SUMMARY

The following summary presents a simplified summary of certain features. The summary is not an extensive overview and is not intended to identify key or critical elements.

Systems, apparatuses, and methods are described for wind power generation and a wind power generation structure. A structure may comprise a takeoff-and-landing deck; and a plurality of duct structures provided along an edge of the takeoff and landing deck. Each duct structure, of the plurality of duct structures, may comprises a wind turbine of a plurality of wind turbines; and is rotatable in a first direction perpendicular from a top surface of the takeoff-and-landing deck.

A structure may comprise a plurality of duct structures; at least one sensor; and a controller comprising at least one processor and at least one memory. The at least one memory may store instructions that, when executed by the at least one processor, are configured to cause the structure to: sense one or more of: an approach, in a vertical direction, of a mobility device to a takeoff-and-landing deck, or that a mobility device is ready for takeoff, in the vertical direction, from the takeoff-and-landing deck; identify a type of the mobility device and a position of a rotor of the mobility device; and control a position of a wind turbine of a duct structure, of the plurality of duct structures, at an edge of the takeoff-and-landing deck by controlling the duct structure to move, to a power generation position based on the position of the rotor, via one or more of: rotating in an upward direction, or moving along the edge of the takeoff-and-landing deck.

A method may comprise sensing one or more of: an approach, in the vertical direction, of a mobility device to a takeoff-and-landing deck, or that a mobility device is ready for takeoff, in the vertical direction, from the takeoff-and-landing deck; identifying a type of the mobility device and a position of a rotor of the mobility device; and controlling a position of a wind turbine of a duct structure at an edge of the takeoff-and-landing deck by controlling the duct structure to move, to a power generation position based on the position of the rotor, via one or more of: rotating in an upward direction, or moving along the edge of the takeoff-and-landing deck.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

3

Figure 11:
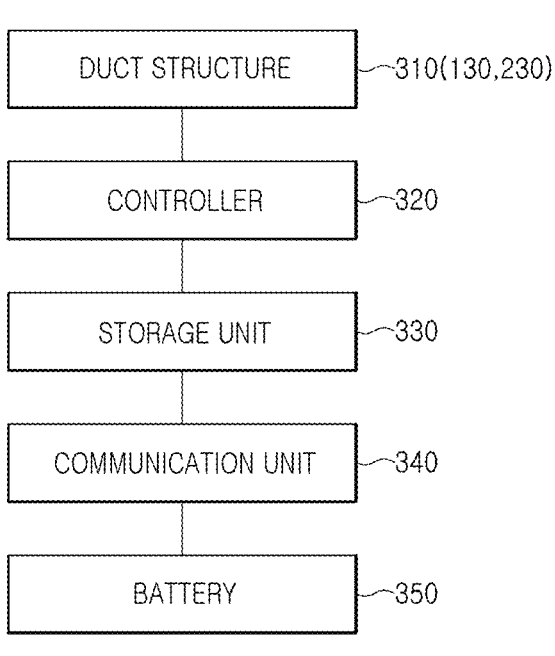

FIG. 11 is a conceptual diagram of a system for driving a wind power generation structure for a vertiport according to an example of the present disclosure.

Figure 12:
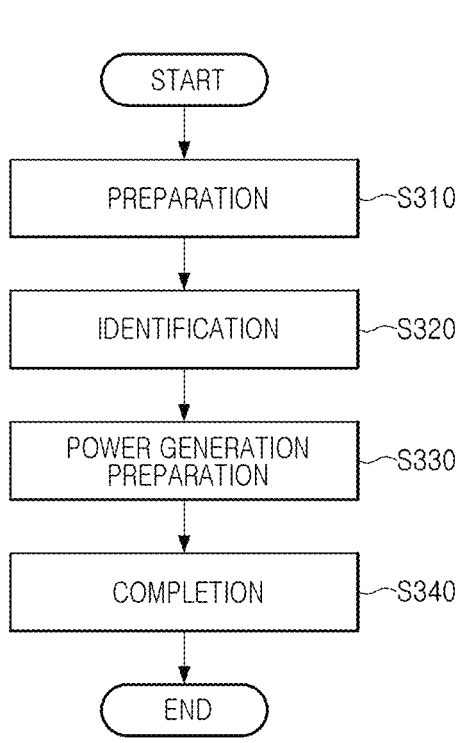

FIG. 12 is a conceptual diagram of a wind power generation method using a wind power generation structure for a vertiport according to an example of the present disclosure.

Figure 13:
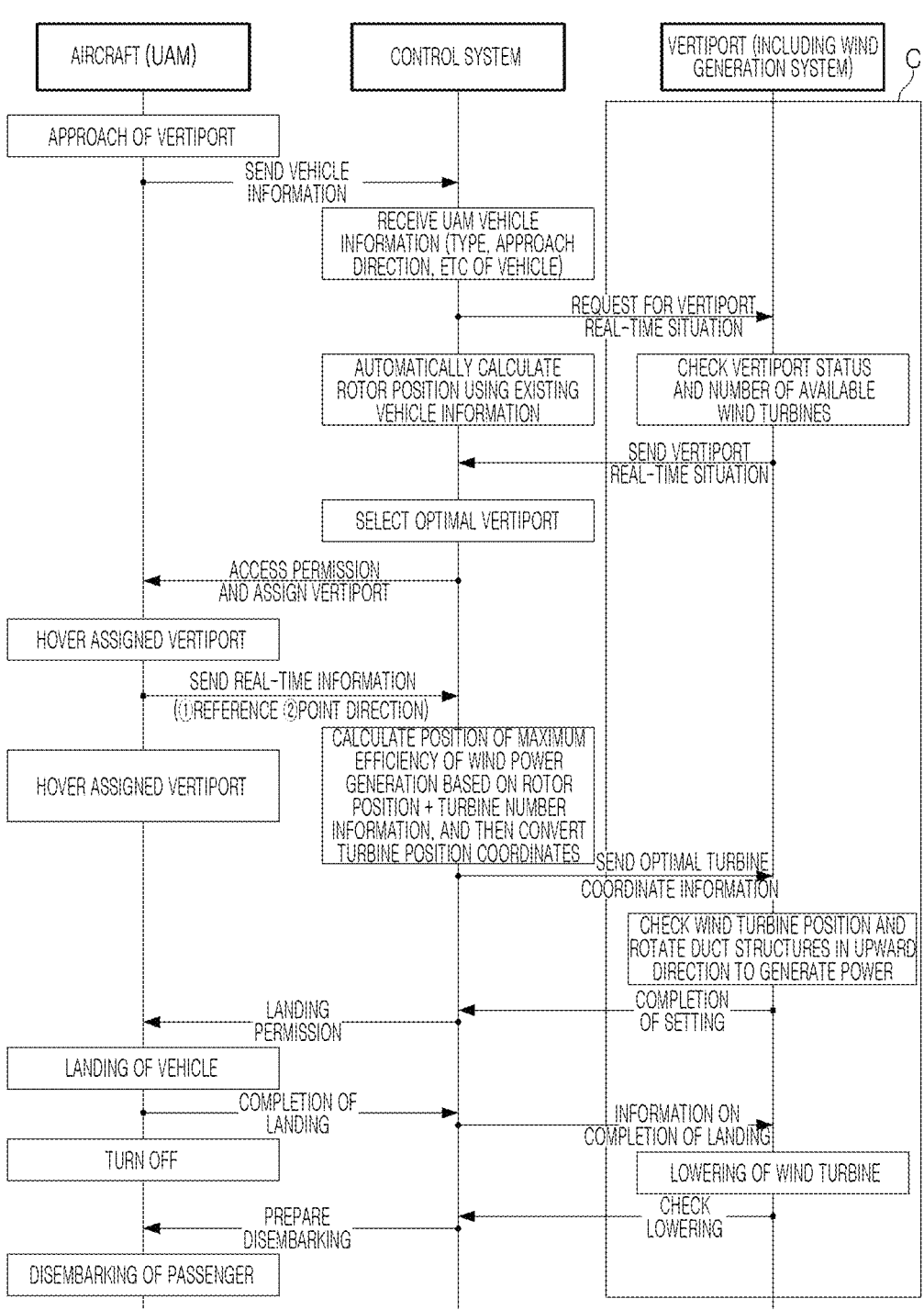

FIG. 13 is a reference diagram illustrating an example of a scenario in which a mobility device lands on a vertiport including a wind power generation structure for the vertiport according to an example of the present disclosure.

DETAILED DESCRIPTION

Since the present disclosure may encompass various changes and may have various examples, specific examples are illustrated in the drawings and described in detail. However, this is not intended to limit the present disclosure to specific examples, it should be understood to include all modifications, equivalents, and substitutes included in the spirit and scope of the present disclosure.

Terms such as first, second, etc. may be used to describe various elements, but the elements should not be limited by the terms. The above terms may be used only for the purpose of distinguishing one component from another. For example, without departing from the scope of the present disclosure, a first component may be referred to as a second component, and similarly, a second component may also be referred to as a first component. The term "and/or" may include a combination of a plurality of related listed items or any of a plurality of related listed items.

Terms such as "portion", "part", "unit", etc. may be used to describe various components, but the components should not be limited by the terms. The above terms may refer to not only a physically/visually distinct configurations, but also terms that describe a function or configuration of the corresponding portion even though a division/section is not clear.

The terms used in the present application may be only used to describe specific examples, and may not be intended to limit the present disclosure. The singular expression may include the plural expression unless the context clearly dictates otherwise. In the present application, terms such as "comprise," "include," "have," and the like are intended to designate that a feature, a number, a step, an operation, a component, a portion, or combination thereof described in the specification exists, but it should be understood that existence or addition of one or more other features, numbers, steps, operations, components, parts, or combinations thereof are excluded in advance.

Unless defined otherwise, all terms used herein, including technical or scientific terms, have the same meaning as commonly understood by one of ordinary skill in the art to which the present disclosure belongs. Terms such as those defined in a commonly used dictionary should be interpreted as having a meaning consistent with the meaning in the context of the related art, and should not be interpreted in an ideal or excessively formal meaning unless explicitly defined in the present disclosure.

In the present specification, a mobility device (e.g., aircraft, drone, vehicle, etc.) may move in a space related to ground, underground, air, space, sea, and/or underwater, depending on a space in which it moves. A mobility device on the ground or underground may be provided in a form of, for example, a vehicle, a robot, etc., and a mobility device in the air or space may be aerial mobility, and may be provided in a form of, for example, a conventional fixed-wing or rotary-wing aircraft, an advanced air mobility

4

(AAM) actively developed recently, an urban air mobility (UAM), an unmanned aerial vehicle or drone, a rocket, a means of transportation mounted on an artificial satellite, or the like. A mobility device on the sea or underwater may be provided in a form of, for example, a ship, a submarine, etc. The mobility devices are not limited to a specific space, and may be a mobile body that may move through all of the above-mentioned spaces, for example, a mobile body that may move between multiple spaces, and may be, for example, an amphibious vehicle, a flying vehicle, etc.

In the description below, terms "anterior," "posterior," "lateral," "front," "behind," "up and down," "vertical," "on," "above," "upper," "upper portion," "below," "lower," "lower portion," "left", "right," and the like, used in relation to direction, may be defined based on a vehicle or a body of the vehicle, and does not limit an overall orientation. In addition, terms such as first and second may be used to describe various components, but these components are not limited in order, size, position, or importance by terms such as first and second, and may be named only for the purpose of distinguishing one component from another.

Hereinafter, preferred examples of the present disclosure will be described in more detail with reference to the attached drawings.

Figure 1:
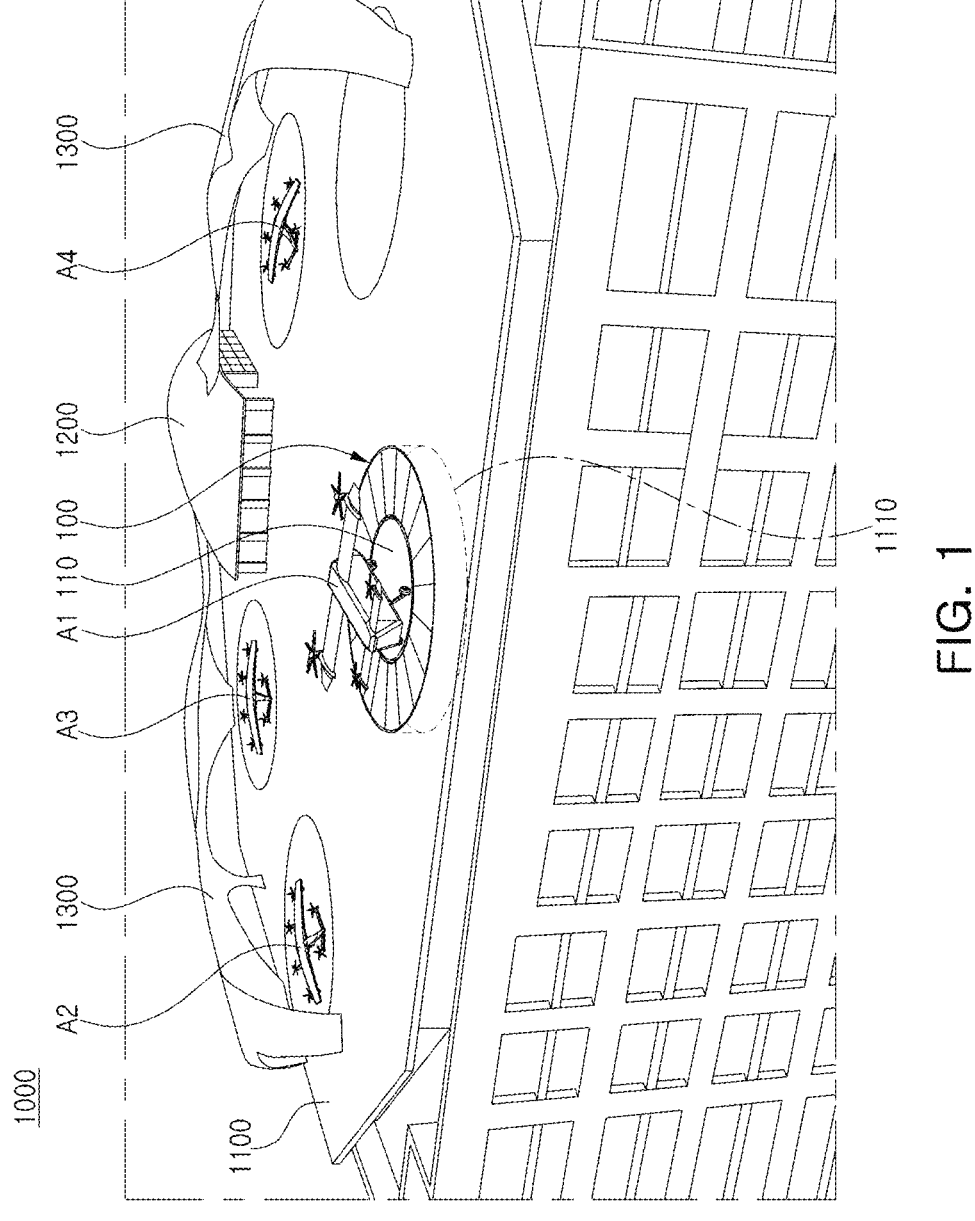
FIG. 1 is a bird's eye view of a vertiport according to an example of the present disclosure.

Referring to FIG. 1, a bird's eye view of a vertiport 1000 according to an example of the present disclosure is illustrated.

The vertiport 1000 may be installed anywhere, including in a central region of a city, on the outskirts of a city, in a building, on the ground, and the like. Also, or alternatively, a mobility device stop 1100 of the vertiport 1000 may be provided as or on a portion of a building, for example, a rooftop, a roof, or the like, and/or may be provided on the ground. In the present example, without limitation and for convenience of explanation, the mobility device stop 1100 is provided on the rooftop of the building.

The vertiport 1000 may include the mobility device stop 1100, which may be a space in which a mobility device may take off, land, and/or park. The mobility device stop 1100 may include a waiting room 1200 in which passengers who want to use the mobility device may wait, and a hangar 1300 in which the mobility device may park. In FIG. 1, mobility devices A2, A3, and A4 are individually parked (docked) in the corresponding hangars 1300, and a mobility device A1 is taking off or landing on a takeoff-and-landing deck 110.

In addition, the vertiport 1000 may manage mobility device taking off and landing at the mobility device stop 1100 by a system comprising a wind power generation structure 100 to generate electricity.

The wind power generation structure 100 may be provided with a takeoff-and-landing deck 110 on which the mobility device A1 can take off and/or land. The mobility device A1 may land on the takeoff-and-landing deck 110, and may then move from the takeoff-and-landing deck 110 to the hangar 1300 (e.g., empty hangar 1300 in FIG. 1). Also, or alternatively, the mobility device A1 taking off may move from the hangar 1300 to the takeoff-and-landing deck 110 (e.g., for takeoff). In addition, when the mobility device A1 moves from the takeoff-and-landing deck 110 to the hangar 1300 or, conversely, from the hangar 1300 to the takeoff-and-landing deck 110, the mobility device may pass on a duct structure 130, which may be used like a bridge.

The takeoff-and-landing deck 110 may be circular, and/or may have a round ring shape when a plurality of duct structures 130 provided along an edge of the takeoff-and-landing deck 110 are aligned.

The mobility device stop 1100 may be provided in and/or on the building. In addition, the wind power generation structure 100 installed at the mobility device stop 1100 may be provided on the rooftop (roof) of the building.

For convenience of movement of the mobility device A1 and/or passengers (people), an upper surface of the takeoff-and-landing deck 110 may be provided to be approximately coplanar with the rooftop (roof) of the building. If the duct structure 130 provided along the edge of the takeoff-and-landing deck 110 is folded, an upper surface thereof may be substantially coplanar with the roof of the building, e.g., for the same reason.

The wind power generation structure 100 including the takeoff-and-landing deck 110 and the duct structure 130 may be installed in a sink groove 1110 provided on a bottom surface of the rooftop. In addition, the sink groove 1110 may be provided in a flat cylindrical shape corresponding to a shape of the wind power generation structure 100.

Figure 2:
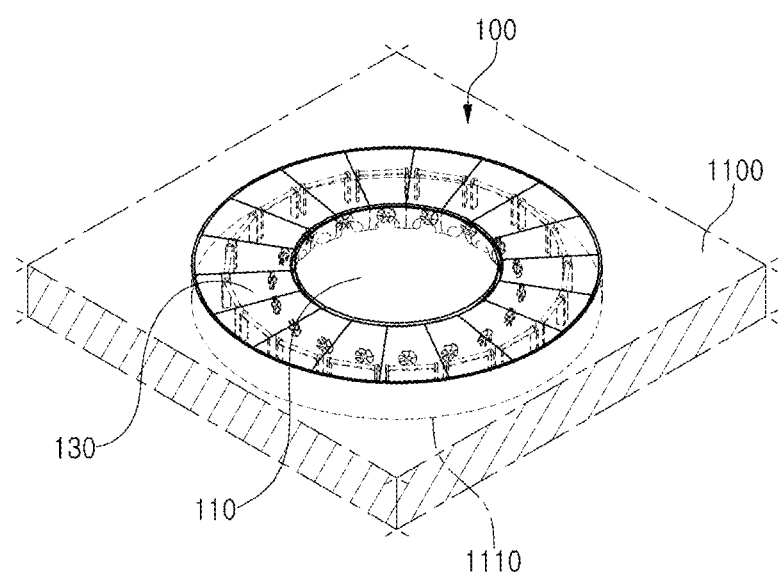
FIG. 2 is a perspective view of a wind power generation structure for a vertiport according to an example of the present disclosure.
Figure 3:
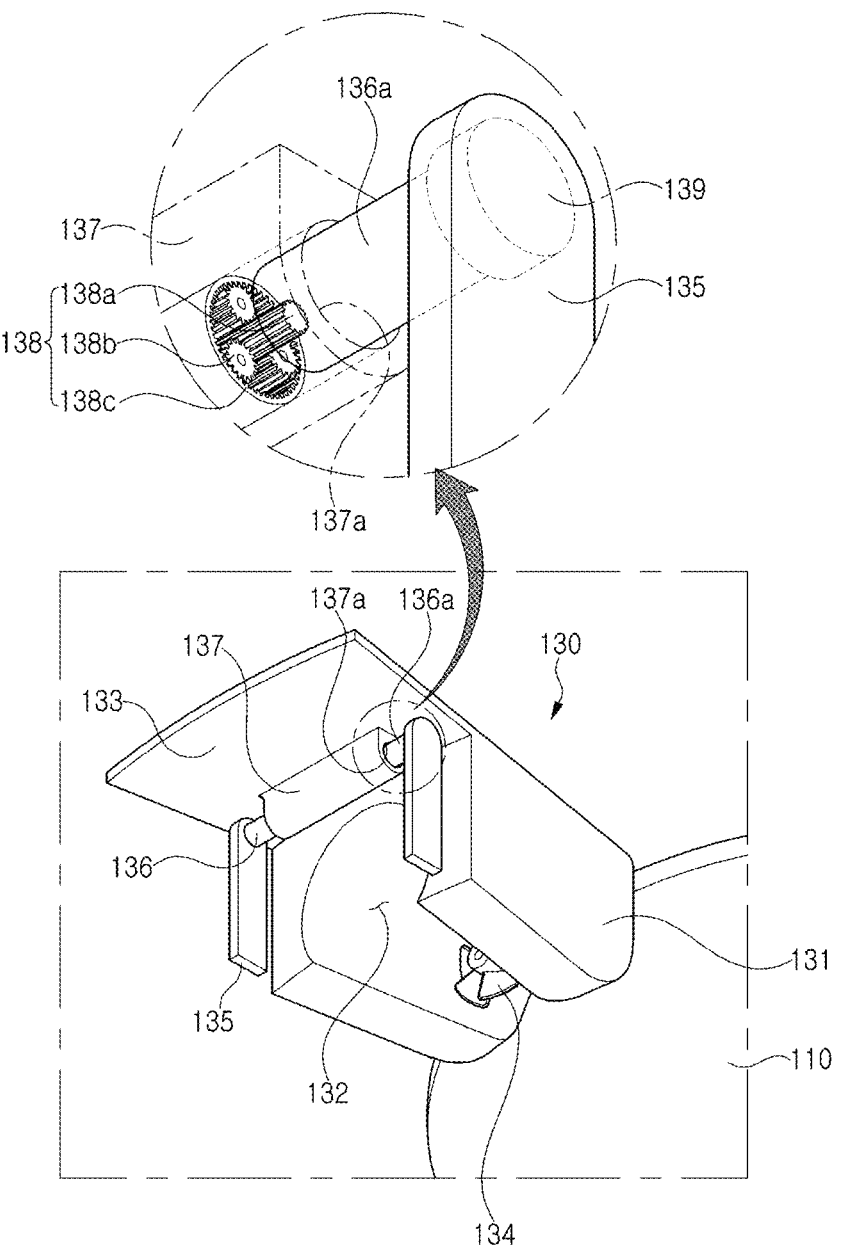
FIG. 3 is a perspective view of a duct structure used in a wind power generation structure for a vertiport according to an example of the present disclosure.
Figure 4:
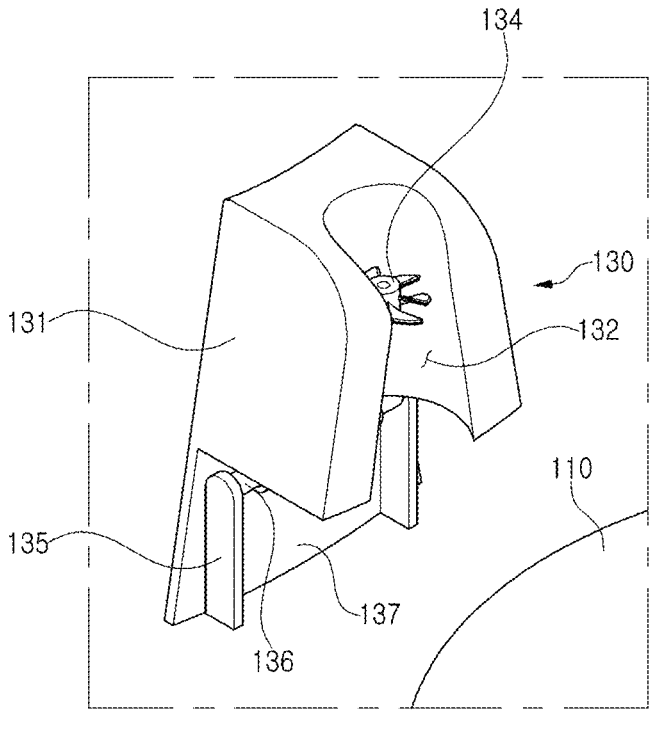
FIG. 4 is a perspective view of a duct structure used in a wind power generation structure for a vertiport according to an example of the present disclosure, in a state in which the duct structure is rotated in an upward direction.

Referring further to FIGS. 2 to 4, a wind power generation structure 100 for a vertiport according to an example of the present disclosure may be installed at a mobility device stop 1100 provided in a building. The mobility device stop 1100 of the building may be provided with a sink groove 1110 in which a wind power generation structure 100 for a vertiport according to an example is installed. The sink groove 1110 may have a cylindrical shape (e.g., may be greater in diameter than depth).

A wind power generation structure 100 for a vertiport according to an example may include a takeoff-and-landing deck 110, and a plurality of duct structures 130 provided along an edge of the takeoff-and-landing deck 110 and individually having a wind turbine 134, respectively.

Also, or alternatively, the plurality of duct structures 130 may be individually/independently (of each other) rotatable in a first direction (e.g., in a direction perpendicular to the takeoff-and-landing deck, such as a vertical direction, and/or around an horizontal axis, wherein the horizontal axis is in a tangential direction to the edge of the takeoff-and-landing deck). One or more duct structures of the plurality of duct structures may rotate in an upward direction (e.g., such that a flat surface of the one or more duct structure rotates from a horizontal orientation to an at least partially vertical orientation) based on/for wind generation (e.g., only when wind power generation is in progress or is to be performed). Rotating in the upward direction may expose/direct the wind turbine 134 provided in the duct 132 in the upward direction. The wind turbine 134 exposed in the upward direction may rotate by wind generated by rotation of a rotor R1 provided on a mobility device A1, to generate electricity.

The takeoff-and-landing deck 110 may be circular, and/or may have, for example, a substantially flat shape, such as a disc shape. Also, or alternatively, the duct structures 130 may be provided continuously along the edge of the takeoff-and-landing deck 110. For example, when the duct structures 130 provided continuously are aligned with the takeoff-and-landing deck 110, a circular ring shape may be formed.

A duct structure 130 may include a body 131 to be rotatable, and a wind turbine 134 provided in a duct 132 formed in the body 131.

The body 131 may be rotatably provided on a support 135 supported on a bottom of the sink groove 1110. The support 135 may be provided with a rotation shaft 136, the body 131 may be provided with a rotation bracket 137, and the rotation shaft 136 may be rotatably fitted into the rotation bracket 137.

The body 131 may be provided with an upper plate 133. When the duct structure 130 is in a folded state (e.g., without generating wind power), only the upper plate 133 may be exposed and/or the upper plate 133 may be substantially horizontal/parallel with the takeoff-and-landing deck 110. The upper plate 133 may be used as a bridge for convenience of movement of the mobility device A1 and passengers (people) in the folded state. For example, the upper plate 133 may be a bridge connecting the mobility device stop 1100 and the takeoff-and-landing deck 110.

The body 131 may have a shape having a width (e.g., diameter) increases in an outward direction from the takeoff-and-landing deck 110 (e.g., when oriented horizontally). For example, the body 131 may have a shape having a width that increases in the outward direction such that the upper plate 133, which serves as a bridge connecting the mobility device stop 1100 and the takeoff-and-landing deck 110 fills the edge of the takeoff-and-landing deck 110. A surface of the body 131 facing the takeoff-and-landing deck 110 may be rounded in the first (e.g., vertical) direction, which may be a rotation direction of the duct structure 130.

The duct structures 130, (e.g., the upper plates 133) may be aligned to form a ring-shaped structure surrounding the edge of the takeoff-and-landing deck 110.

The body 131 and the upper plate 133 may form an exterior of the duct structure 130, and the body 131 may be provided with the duct 132 having a hole shape or a groove shape such that the wind turbine 134 is installed therein. As the wind turbine 134 is provided in the duct 132, wind from the rotor R1 of the mobility device A1 may be concentrated, and more efficient wind power generation may be achieved.

The duct 132 may have a shape with a width (e.g., diameter) that increases in the outward direction from the takeoff-and-landing deck 110 when the duct structure 130 is. This increasing width of the duct away from the takeoff-and-landing deck 110 may improve rotational efficiency of the wind turbine 134.

The plurality of duct structures 130 may be individually provided with adjustable rotation angles in the first (e.g., vertical) direction. A duct structure 130 to be used for wind power generation may be selected, based on a position of the rotor R1 of the mobility device A1, and rotated in the upward direction. For example, depending on a height and/or a position of the rotor R1 of the mobility device A1, a direction in which the duct structure 130 faces may be adjusted by changing a rotation angle of the duct structure 130.

The duct structure 130 may include the body 131 to be rotatable, and the body 131 may be rotatably mounted on the support 135 supported on the bottom of the sink groove 1110. The upper plate 133 provided on the body 131 may be rotatably provided on the support 135 supported on the bottom of the sink groove 1110. The support 135 may be provided with the rotation shaft 136, the body 131 and/or the upper plate 133 may be provided with the rotation bracket 137, and/or the rotation shaft 136 may be rotatably fitted into the rotation bracket 137.

The plurality of duct structures 130 may be individually provided to adjust a rotation angle in the first (e.g., vertical) direction. For a rotation shaft 136 and a corresponding rotation bracket 137, forming a pair, one of the rotation shaft 136 or the corresponding rotation bracket 137 may be provided with a male screw protrusion 136a, and the other thereof may be provided with a female thread groove (e.g., a female thread hole, 137a) in which the male screw protrusion may be seated, rotated, and coupled. In the drawings, the female thread groove and the male screw protrusion are illustrated by specifying positions thereof for convenience. A position of the female thread groove and a position of the male screw protrusion may be provided differently from those illustrated in the drawings, and may have various modified structures, depending on intention of a designer.

To drive these individually, one of the female thread groove and the male screw protrusion, provided on the rotation shaft 136 and the rotation bracket 137, respectively, may be provided with a drive motor 139, and the other thereof may be provided with a gearbox 138.

For example, the rotation shaft 136 and the rotation bracket 137 may be provided with the drive motor 139 and the gearbox 138, and the drive motor 139 and the gearbox 138 may be individually driven and controlled. The gearbox 138 may be connected to the drive motor 139, and power may be transmitted, as the drive motor 139 is driven, to reduce speed in the gearbox 138 and rotate the upper plate 133. The gearbox 138 may serve as a speed reducer.

The drive motor 139 and the gearbox 138 may be separately provided into the rotation shaft 136 and the rotation bracket 137, fitted into and coupled to rotate relative to each other. For example, one of the rotation shaft 136 and the rotation bracket 137 may be provided with the drive motor 139, and the other thereof may be provided with the gearbox 138 connected to the drive motor 139.

For example, as illustrated in the enlarged view of FIG. 3, the gearbox 138 may have a structure in which a sun gear 138a, a planet gear 138b, and a ring gear 138c are sequentially connected, and the drive motor 139 may be connected to the sun gear 138a. For example, the male screw protrusion, which may be the rotation shaft 136 of the drive motor 139, may be fitted into the female thread groove 137a of the rotation bracket 137, and the rotation shaft 136a may be connected and transmit power to the sun gear 138a provided on the rotation bracket 137.

Figure 5:
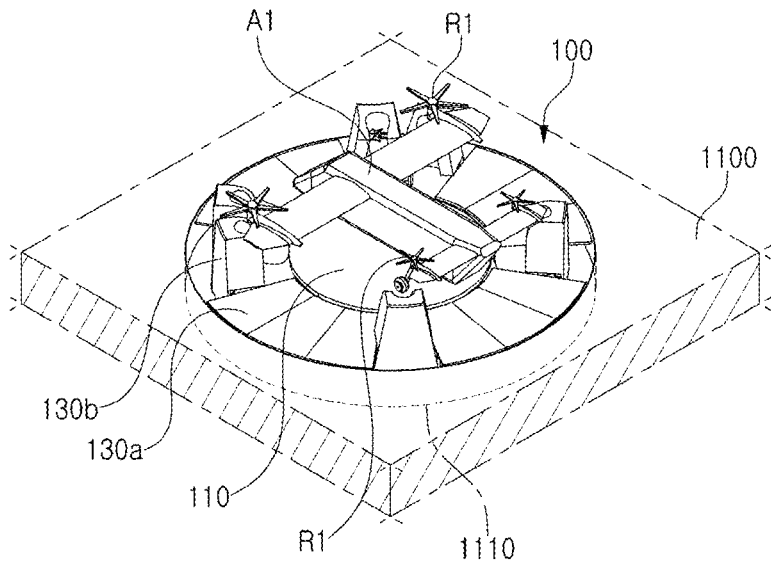
FIG. 5 is a reference diagram of wind power generation using a mobility device that is about to land or take off using a wind power generation structure for a vertiport according to an example of the present disclosure.

Referring to FIG. 5, an example of wind power generation using a wind power generation structure 100 for a vertiport according to an example of the present disclosure is illustrated.

A mobility device A1 may take off and land in a first (e.g., vertical) direction, and therefore, when the mobility device A1 attempts to land on a takeoff-and-landing deck 110 or when the mobility device A1 attempts to take off from the takeoff-and-landing deck 110, a rotor R1 of the mobility device A1 may rotate, for example, in a direction facing the takeoff-and-landing deck 110, to form a strong wind toward a bottom. The wind power generation structure 100 of the present example may generate wind power by using the strong wind blowing toward the bottom, formed at this time.

For example, during the takeoff-and-landing of the mobility device A1, a type of the mobility device A1 and therefore a position of the rotor R1 may be identified, and a duct structure 130 at the most efficient position may be used, according to the position of the rotor R1, to allow wind power generation.

As can be seen in FIG. 5, the duct structure 130 of the wind power generation structure 100 may include a plurality of individual duct structures, each of which may individually be folded or rotated in an upward direction to receive wind from a rotor. For example, FIG. 5 shows an example folded duct structures 130a, maintaining a folded state without rotating, and rotated duct structures 130b, rotated in an upward direction to receive a wind from the rotor(s) R1. For example, a mobility device A1 taking off and landing may have a total of four rotors R1, and the rotors may rotate in to blow a strong wind downward (towards the takeoff-and-landing deck 110). The mobility device A1 taking off and landing may be disposed on the takeoff-and-landing deck 110, or may be hovering/moving above the portion of the takeoff-and-landing deck 110 for takeoff-and-landing.

Rotated duct structures 130b may correspond to the position of the rotor R1. The most efficient wind power generation may be achieved at the most optimal position considering the type of the mobility device A1 and therefore the number, type and position of the rotors R1. The rotated duct structures 130b may be selected for rotation in the upward direction, and may be used for wind power generation. In this case, the rotated duct structures 130b may be selected for rotation based on efficiency of wind power generation (e.g., maximizing/increasing efficiency of wind power generation). For example, the rotated duct structures 130b may be those having a duct 132 located closest in a straight direction in which a wind blows from the rotor. For example, in FIG. 5, it can be seen that the rotated duct structures 130b are those located directly below the rotors R1. Also, or alternatively, depending on a size or a position of the rotor R1, one or two or more duct structures 130 per rotor R1 may rotate in the upward direction to be rotated duct structures 130b, and may be therefore used for wind power generation.

Folded duct structures 130a maintaining a folded state without rotating may serve as a bridge through which people (e.g., passengers, workers, loaders/unloaders) and/or other vehicles (e.g., robots, ground transport, etc.) may pass while getting/transporting cargo on and off the mobility device A1.

Figure 6:
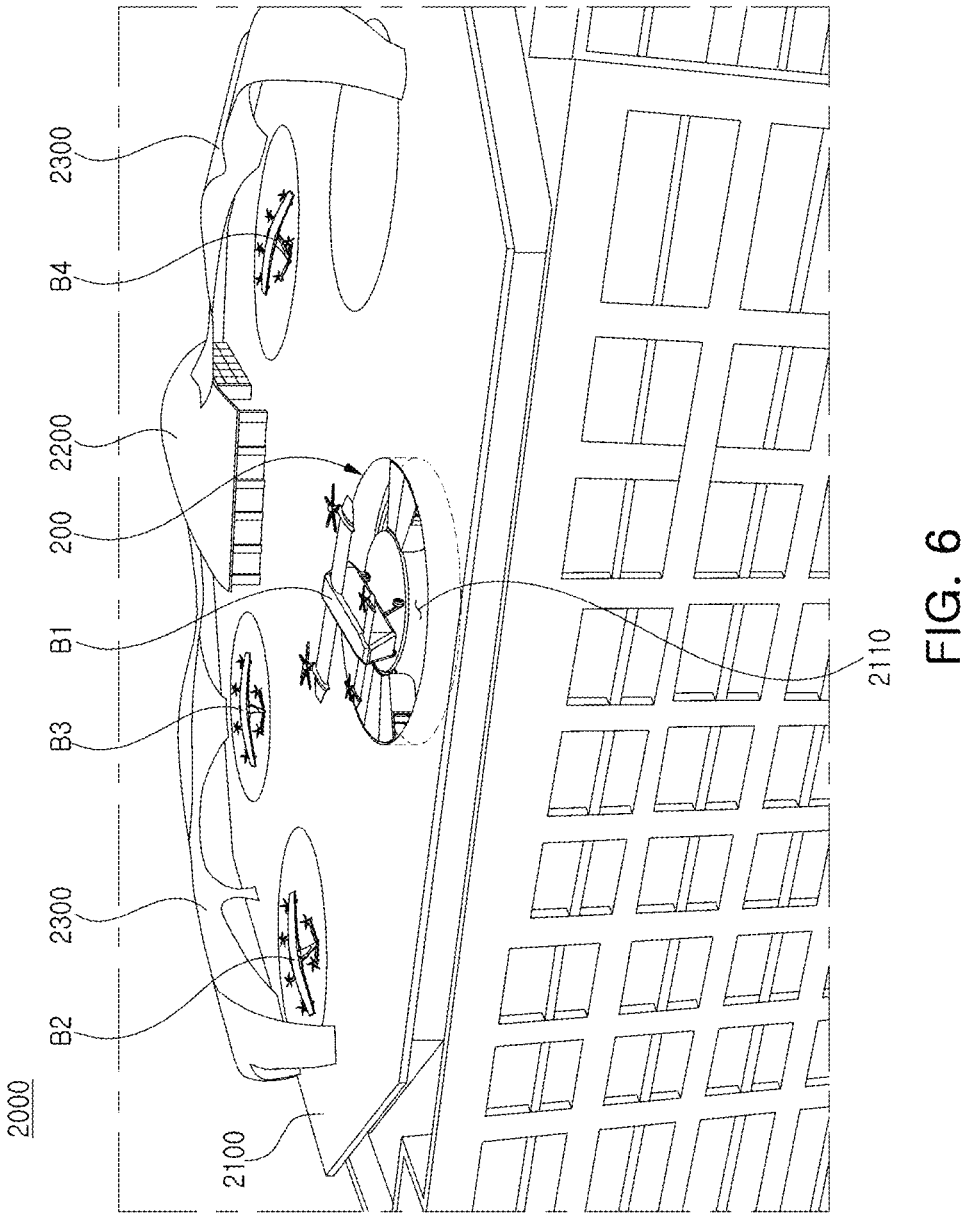
FIG. 6 is a bird's eye view of a vertiport according to another example of the present disclosure.
Figure 7:
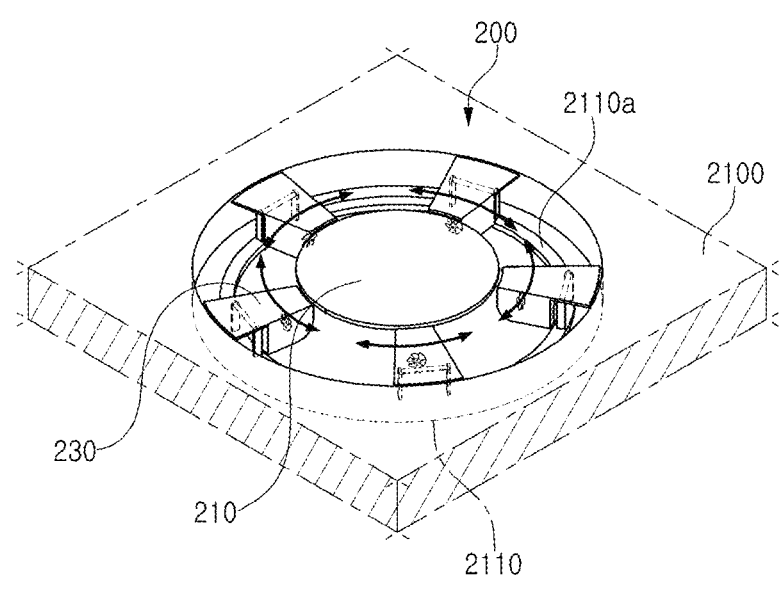
FIG. 7 is a perspective view of a wind power generation structure for a vertiport according to another example of the present disclosure.

FIG. 6 shows a bird's eye view of a vertiport 2000 according to another example of the present disclosure. The vertiport 2000 of another example may have the same configuration as the vertiport 1000 of an example, but there may be a difference in structure of a wind power generation structure 200 for a vertiport provided therein.

The vertiport 2000 may be installed anywhere, including in a central region of a city, or on outskirts of the city, in a building, on a ground, and the like. Also, or alternatively, a mobility device stop 2100 forming the vertiport 2000 may be provided as a portion of the building, for example, a rooftop, a roof, or the like, or may be provided on the ground. In the present example, for convenience of explanation, the mobility device stop 2100 provided on the rooftop of the building may be used as an example.

The vertiport 2000 may include the mobility device stop 2100, which may be a space in which a mobility device may take off, land, and park. The vertiport 2000 may be provided at the mobility device stop 2100, and the mobility device stop 2100 may include a waiting room 2200 in which passengers who want to use the mobility device may wait, and a hangar 2300 in which the mobility device may park. In FIG. 5, it is illustrated that mobility device B2, B3, and B4 are individually parked (docked) in the hangar 2300, and a mobility device A1 is taking off or landing on a deck.

In addition, the vertiport 2000 may manage mobility device taking off and landing at the mobility device stop 2100 by a system, and such a system may include using a wind power generation structure 200 for the vertiport, provided at the vertiport in which the mobility device take off or land, to generate electricity.

The wind power generation structure 200 may be provided with a takeoff-and-landing deck 210 on which the mobility device B1 may takes off or land, and the landing mobility device B1 may land on the takeoff-and-landing deck 210, and may then move from the takeoff-and-landing deck 210 to the hangar 2300. Also, or alternatively, the mobility device B1 taking off may move from the hangar 2300 to the takeoff-and-landing deck 210. In addition, when the mobility device B1 moves from the takeoff-and-landing deck 210 to the hangar 2300 or, conversely, from the hangar 2300 to the takeoff-and-landing deck 210, the mobility device may pass on a duct structure 230, which may be used like a bridge.

The takeoff-and-landing deck 210 may be circular (or another shape), and a plurality of duct structures 230 may be provided along an edge of the takeoff-and-landing deck 210. Also, or alternatively, the plurality of duct structures 230 may move along the edge of the takeoff-and-landing deck 210.

The mobility device stop 2100 may be provided in the building. In addition, the wind power generation structure 200 installed at the mobility device stop 2100 may be provided on the rooftop (roof) of the building.

In addition, for convenience of movement of the mobility device B1 and/or people (e.g., passengers, workers, etc.), an upper surface of the takeoff-and-landing deck 210 may be provided to be approximately coplanar with the rooftop (roof) of the building. If the duct structure 230 provided along the edge of the takeoff-and-landing deck 210 is folded, an upper surface thereof may be substantially coplanar with the roof of the building for the same reason.

Therefore, the wind power generation structure 200 including the takeoff-and-landing deck 210 and the duct structure 230 may be installed in a sink groove 2110 provided on a bottom surface of the rooftop. Also, or alternatively, the sink groove 2110 may be provided in a flat cylindrical shape corresponding to a shape of the wind power generation structure 200.

Referring further to FIGS. 7 to 10, a wind power generation structure 200 for a vertiport according to another example of the present disclosure may be installed at a mobility device stop 2100 provided in a building. The mobility device stop 2100 of the building may be provided with a sink groove 2110 in which a wind power generation structure 200 for a vertiport according to an example is installed. The sink groove 2110 may have a flat cylindrical shape.

A wind power generation structure 200 for a vertiport according to an example may include a takeoff-and-landing deck 210, and one or more duct structures 230 provided along an edge of the takeoff-and-landing deck 210, individually having a wind turbine 234, respectively, and capable of moving along the edge of the takeoff-and-landing deck 210.

The duct structure 230 installed in the wind power generation structure 200 of another example may have the same structure as the duct structure 130 installed in the wind power generation structure 100 of an example, except that the duct structure 230 of another example should move along the edge of the takeoff-and-landing deck 210, and may thus further include a wheel 235a provided on a lower end of a support 235. Also, or alternatively, since the one or more duct structures 230 should move along the edge of the takeoff-and-landing deck 210, it may not be provided continuously along the edge of the takeoff-and-landing deck, but may be provided at certain intervals to secure movement space.

Also, or alternatively, the plurality of duct structures 230 may be individually provided to be rotatable in a first (e.g., vertical) direction, and may rotate in an upward direction only when wind power generation is in progress, to expose the wind turbine 234 provided in a duct 232 in the upward direction. In addition, the wind turbine 234 exposed in the upward direction may rotate by strong wind generated by rotation of a rotor provided on a mobility device B1, to generate electricity.

The takeoff-and-landing deck 210 may be circular, as a non-limiting illustrative example. The takeoff-and-landing deck 210 may have, for example, a disc shape. Also, or alternatively, the duct structures 230 may be provided continuously along the edge of the takeoff-and-landing deck 210, and when the duct structures 230 provided continuously are aligned, a circular ring shape may be formed.

A duct structure 230 may include a body 231 to be rotatable, and a wind turbine 234 provided in a duct 232 formed in the body 231.

The body 231 may be rotatably provided on the support 235 supported on a bottom of the sink groove 2110. The support 235 may be provided with a rotation shaft 236, the body 231 may be provided with a rotation bracket 237, and the rotation shaft 236 may be rotatably fitted into the rotation bracket 237. A surface of the body 231 facing the takeoff-and-landing deck 210 (e.g., when the duct structure 230 is folded) may be rounded in the first (e.g., vertical) direction, which may be a rotation direction.

The body 231 may be provided with a upper plate 233. If the duct structure 230 may be in a folded state without generating wind power, only the upper plate 233 may be exposed.

The upper plate 233 may be used as a bridge for convenience of movement of the mobility device B1, e.g., for people (e.g., passengers and/or workers) and/or ground vehicles/robots in the folded state. For example, the upper plate 233 may be a bridge connecting the mobility device stop 2100 and the takeoff-and-landing deck 210.

Since the duct structure 230 may move along the edge of the takeoff-and-landing deck 210, an empty space not filled with the duct structure 230 between the takeoff-and-landing deck 210 and the mobility device stop 2100 may be generated. Therefore, if wind power generation is not in progress, the duct structures 230 may move to a predetermined position to be adjacent to each other, and may serve as a bridge via which people (e.g., passengers) and/or ground vehicles/robots may move (see FIG. 9).

The body 231 may have a shape of which a width increases in an outward direction from the takeoff-and-landing deck 210. For example, the body 231 may have a shape of which a width (e.g., diameter) increases in the outward direction such that the upper plate 233, which serves as a bridge connecting the mobility device stop 2100 and the takeoff-and-landing deck 210 fills the edge of the takeoff-and-landing deck 210. The duct structures 230, and more specifically, the upper plates 233 may be aligned (e.g., in a folded state) to implement a ring-shaped structure surrounding the edge of the takeoff-and-landing deck 210.

The body 231 and the upper plate 233 may form an exterior of the duct structure 230, and the body 231 may be provided with the duct 232 having a hole shape or a groove shape such that the wind turbine 234 is installed therein. As the wind turbine 234 is provided in the duct 232, wind from the rotor of the mobility device B1 may be concentrated, and more efficient wind power generation may be achieved.

Also, or alternatively, the duct 232 may have a shape of which diameter increases in the outward direction, which may be a direction in which the takeoff-and-landing deck 210 is provided, to improve rotational efficiency of the wind turbine 234.

The plurality of duct structures 230 may be individually provided with adjustable rotation angles in the first (e.g., vertical) direction. Also, or alternatively, depending on a position of the rotor of the mobility device B1, the duct structure 230 to be used for wind power generation may move (see FIG. 10), and more specifically, depending on a height or a position of the rotor of the mobility device B1, a direction in which the duct structure 230 faces may be adjusted by changing a rotation angle.

The duct structure 230 may include the body 231 to be rotatable, and the body 231 may be rotatably mounted on the support 235 supported on the bottom of the sink groove 2110. Also, or alternatively, the support 235 may be provided with the wheel 235a in a lower end portion, and the duct structure 230 may move along the edge of the takeoff-and-landing deck 210 using the wheel 235a.

In this case, the wheel 235a may be provided in the lower end portion of the support 235 of the duct structure 230, and may be rotatable by a motor or the like to move the duct structure 230 by its own power. Also, or alternatively, the sink groove 2110 may be provided with a rotating rail 2110a on which the wheel 235a may ride and move in a circular shape along the edge of the takeoff-and-landing deck 210.

Of course, the upper plate 233 provided on the body 231 may be rotatably provided on the support 235 supported at the bottom of the sink groove 2110. The support 235 may be provided with the rotation shaft 236, the body 231 or the upper plate 233 may be provided with the rotation bracket 237, and the rotation shaft 236 may be rotatably fitted into the rotation bracket 237.

The plurality of duct structures 230 may be individually provided to adjust a rotation angle in the first (e.g., vertical) direction, and for this purpose, one of the rotation shaft 236 and the rotation bracket 237, forming a pair, may be provided with a male screw protrusion 236a, and the other thereof may be provided with a female thread groove (or female thread hole, 237a) in which the male screw protrusion is seated, rotated, and coupled. In the drawings, the female thread groove and the male screw protrusion are illustrated by specifying positions thereof for convenience. A position of the female thread groove and a position of the male screw protrusion may be provided differently from those illustrated in the drawings, and may have various modified structures, depending on intention of a designer.

To drive these individually, one of the female thread groove and the male screw protrusion, provided on the rotation shaft 236 and the rotation bracket 237, respectively, may be provided with a drive motor 239, and the other thereof may be provided with a gearbox 238.

For example, the rotation shaft 236 and the rotation bracket 237 may be optionally provided with the drive motor 239 and the gearbox 238, and these may be individually driven and controlled. The gearbox 238 may be connected to the drive motor 239, and power may be transmitted, as the drive motor 239 is driven, to reduce speed in the gearbox 238 and rotate the upper plate 233. The gearbox 238 may serve as a speed reducer.

The drive motor 239 and the gearbox 238 may be divided and provided into the rotation shaft 236 and the rotation bracket 237, fitted into and coupled to rotate relative to each other. For example, one of the rotation shaft 236 and the rotation bracket 237 may be provided with the drive motor 239, and the other thereof may be provided with the gearbox 238 connected to the drive motor 239.

Figure 8:
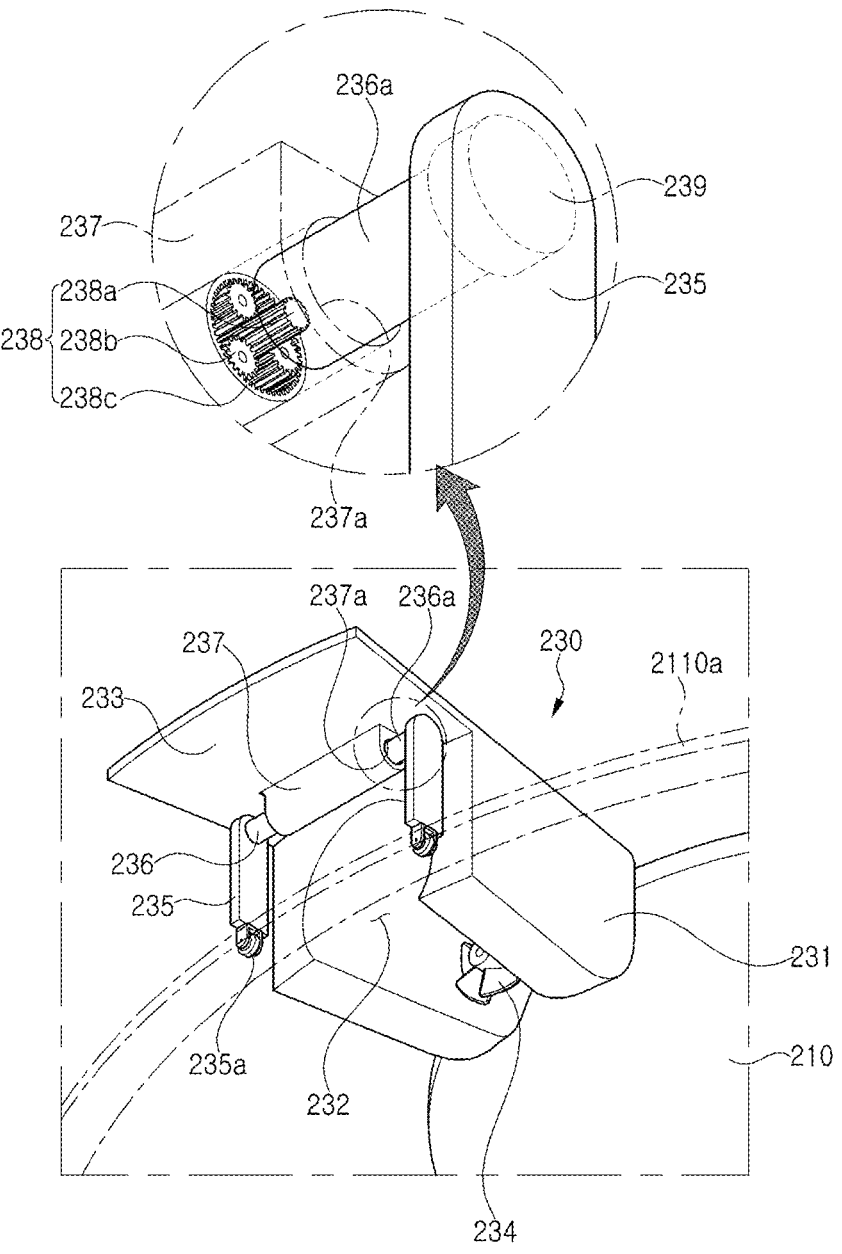
FIG. 8 is a perspective view of a duct structure used in a wind power generation structure for a vertiport according to another example of the present disclosure.
Figure 9:
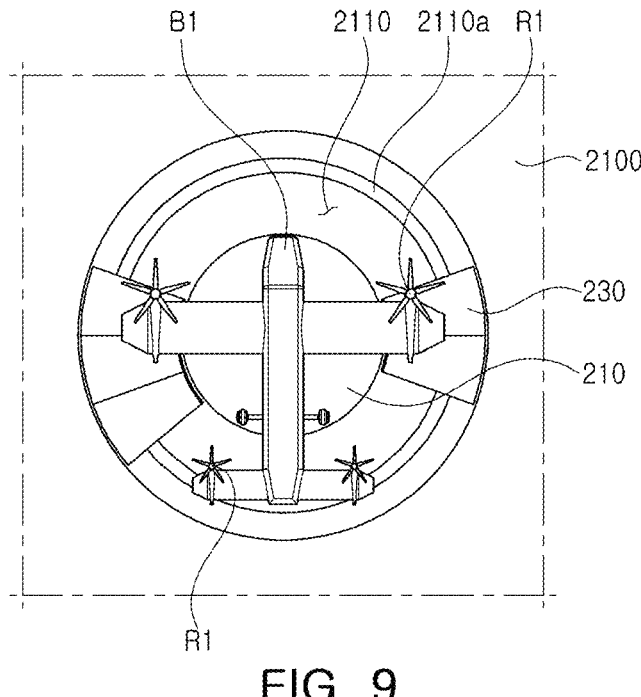
FIG. 9 is a perspective view of a duct structure used in a wind power generation structure for a vertiport according to another example of the present disclosure in a state in which the duct structure is moved to a walking path of a user.

For example, as illustrated in the enlarged view of FIG. 8, the gearbox 238 may have a structure in which a sun gear 238a, a planet gear 238b, and a ring gear 238c are sequentially connected, and the drive motor 239 may be connected to the sun gear 238a. For example, the male screw protrusion, which may be the rotation shaft 236a of the drive motor 239, may be fitted into the female thread groove 237a of the rotation bracket 237, and the rotation shaft 236a may be connected and transmit power to the sun gear 238a provided on the rotation bracket 237.

Figure 10:
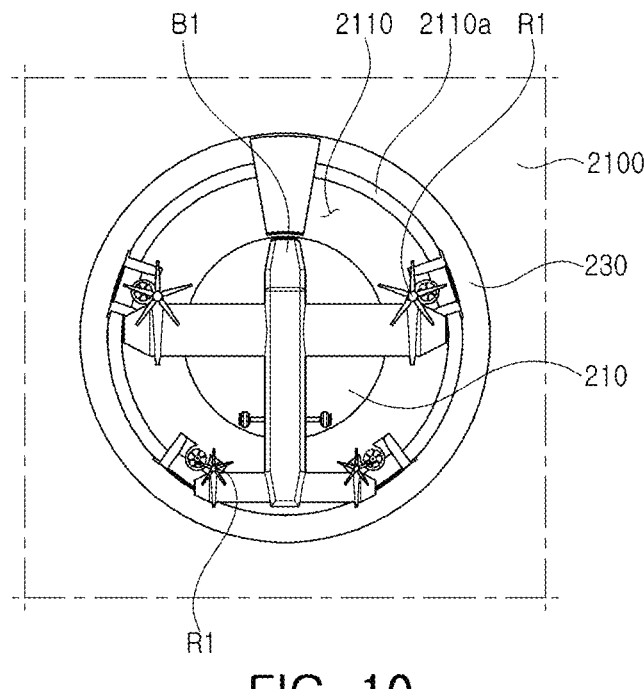
FIG. 10 is a reference diagram of wind power generation using a mobility device that is about to land or take off using a wind power generation structure for a vertiport according to another example of the present disclosure.

Referring to FIG. 10, an example of wind power generation using a wind power generation structure 200 for a vertiport according to another example of the present disclosure is illustrated.

A mobility device B1 may take off and land in a first (e.g., vertical) direction, and therefore, when the mobility device B1 attempts to land on a takeoff-and-landing deck 210 or when the mobility device B1 attempts to take off from the takeoff-and-landing deck 210, a rotor of the mobility device B1 may rotate, for example, in a direction facing the takeoff-and-landing deck 210, to form a strong wind toward a bottom. The wind power generation structure 200 of the present example may generate wind power by using the strong wind blowing toward the bottom, formed at this time.

For example, during the takeoff-and-landing of the mobility device B1, a type of the mobility device B1 and therefore a position of the rotor may be identified, and a duct structure 230 at the most efficient position may be used, according to the position of the rotor, to allow wind power generation.

As can be seen in FIG. 10, the duct structure 230 of the wind power generation structure 200 may move to a position, which may best receive a wind of the rotor, to receive the wind of the rotor, and may rotate in the upward direction. And, for example, a mobility device B1 taking off and landing has a total of six rotors, and the rotors may rotate in a direction facing a bottom, and may blow a strong wind to the bottom. Of course, in this case, the mobility device B1 taking off and landing may be disposed on the takeoff-and-landing deck 210, or may be hovering in the upper portion of the takeoff-and-landing deck 210 for takeoff-and-landing.

Therefore, duct structures 230 rotated in the upward direction may correspond to the position of the rotor, and the most efficient wind power generation may be achieved at the most optimal position considering the type of the mobility device B1 and therefore the position of the rotor. The duct structures 230 may rotate in the upward direction, and may be used for wind power generation. In this case, positions of the duct structures 230 in which the most efficient wind power generation is achieved may be to move the duct structures 230 to overlap in a straight direction in which a wind blows from the rotor.

Referring to FIG. 11, a wind power generation system 300 for a vertiport according to an example of the present disclosure may include at least a portion of a duct structure 310, a controller 320, a storage unit 330 (e.g., storage and/or memory), a communication unit 340 (e.g., communication circuit, transceiver), and a battery 350.

The wind power generation system 300 of the present example may be a system controlling wind power generation using the wind power generation structures 100 and 200 of the examples of the present disclosure.

The wind power generation system 300 of the present example may be operated in a state in which a mobility device (A1 or B1) landed on a takeoff-and-landing deck (110 or 210) or in a state in which the mobility device (A1 or B1) hovers while preparing for takeoff-and-landing on the takeoff-and-landing deck (110 or 210). Also, or alternatively, a rotor of the mobility device (A1 or B1) may rotate in a downward direction such that a strong downdraft blows toward the takeoff-and-landing deck (110 or 210).

The wind power generation system 300 of the present example may generate wind power by operating a wind power generation structure (100 or 200) provided in the vertiport.

Specifically, a wind power generation system 300 for a vertiport according to an example of the present disclosure, as an example, may include at least a portion of the wind power generation structure (100 or 200) including the duct structure 310 (130 or 230), the controller 320 that issues a power generation command to the wind power generation structure (100 or 200) depending on a position of the mobility device (A1 or B1), the storage unit 330 that stores information such as a type of the mobility device and a position of the rotor, the communication unit 340 that exchanges information with a control system, and the battery 350 that stores and uses power produced by the wind power generation structure (100 or 200).

The wind power generation structure (100 or 200) including the duct structures 310 (130 or 230) may correspond to the wind power generation structure (100 or 200) of the present example described with reference to FIGS. 1 to 10.

Also, or alternatively, the controller 320 may issue a power generation command to the wind power generation structure (100 or 200) according to a position of the mobility device (A1 or B1), may determine a position of the rotor according to a type of the mobility device (A1 or B1) using information stored in the storage unit 330 or information transmitted from the control system, may select a duct structure 130 of a wind power generation structure 100 and set an upward rotation angle, or may move a duct structure 230 of a wind power generation structure 200 to a position corresponding to the rotor and set the upward rotation angle.

Also, or alternatively, the controller 320 may command the wind power generation structure (100 or 200) to store or use power produced by the power generation command in the battery 350.

The communication unit 340 may be provided in the wind power generation system 300, and may exchange information with the control system through a wired or wireless communication network. The control system may exchange information with the mobility device through a communication network, and the control system may transmit this exchanged information to the wind power generation system 300.

Referring to FIG. 13, an example of a scenario in which a mobility device lands at a vertiport is illustrated. In this case, the controller 320 may control all commands received or transmitted from the vertiport (contents in a rectangular box C).

For example, the controller 320 may perform all controls related to an operation of the wind power generation system 300 of the present example.

Referring to FIG. 12, a wind power generation method (S300) for a vertiport according to an example of the present disclosure is illustrated. For convenience, FIG. 12 is described by way of an example in which the steps are performed by a processor circuit. One, some, or all steps of the example method of FIG. 12, or portions thereof, may be performed by one or more other circuits. One or some, steps of the example method of FIG. 12 may be omitted, performed in other orders, and/or otherwise modified, and/or one or more additional steps may be added.

The wind power generation method (S300) may include a preparation operation (S310) of sensing approach of a mobility device to a takeoff-and-landing deck in a first (e.g., vertical) direction or whether a mobility device is ready for takeoff from a takeoff-and-landing deck in the first (e.g., vertical) direction; an identification operation (S320) of identifying a type of the mobility device and a position of a rotor of the mobility device; and a power generation preparation operation (S330) of commanding a duct structure to rotate in an upward direction and/or to move along an edge of the takeoff-and-landing deck, according to the position of the rotor of the mobility device and/or the type of the mobility device.

The wind power generation method (S300) of the present example may be implemented by a wind power generation system 300 for a vertiport, as illustrated in FIG. 11. Also, or alternatively, operations of the wind power generation method (S300) may be controlled by a controller 320 based on (e.g., using) information stored in a storage unit 330.

The preparation operation (S310) may sense approach of a mobility device to the takeoff-and-landing deck in a first (e.g., vertical) direction and/or whether (e.g, that) the mobility device is ready for takeoff from a takeoff-and-landing deck in a first (e.g., vertical) direction. The preparation operation (S310) may use information received from the vertiport in a control system, as illustrated in FIG. 13, or information previously stored or updated in the storage unit 330.

In the identification operation (S320), a type of mobility device may be identified and/or a position of a rotor of the mobility device may be identified. In the identification operation (S320), the type of mobility device may be identified and/or the position of the rotor may be identified based on (e.g., using) the information received from the vertiport in the control system, as illustrated in FIG. 13, or the information previously stored or updated in the storage unit 330.

The identification operation (S320) may receive coordinates regarding arrangement of each rotor from a center of the mobility device, and may calculate a position of each rotor.

The power generation preparation operation (S330) may command the duct structure to rotate in an upward direction, depending on the position of the rotor of the mobility device (using a wind power generation structure 100, as illustrated in FIGS. 1 to 5), or may command the duct structure to move along the edge of the takeoff-and-landing deck (using a wind power generation structure 200, as illustrated in FIGS. 6 to 10). Further, the power generation preparation operation (S330) may include a combination of commands to rotate or move—for example, individual duct structures (e.g., of any of FIGS. 1-10) may be selected for rotation based on position relative to the rotors and further commanded to move and rotate to best receive air from said rotors.

The power generation preparation operation (S330), when using the wind power generation structure 100, as illustrated in FIGS. 1 to 5, may command the duct structure to move to a position in which wind power generation can obtain maximum efficiency according to the position of each rotor calculated in the identification operation (S320), and may command the duct structure to rotate an angle of the duct structure in the upward direction such that a duct faces the rotor.

The power generation preparation operation (S330), using the wind power generation structure 200, as illustrated in FIGS. 6 to 10, may command only the duct structure to rotate an angle of the duct structure in the upward direction in a position in which wind power generation can obtain maximum efficiency according to the position of each rotor calculated in the identification operation (S320).

After the power generation preparation operation (S330), based on landing or takeoff of the mobility device being completed and/or wind power generation of the rotor being completed, a completion operation (S340) of commanding the duct structure to rotate an angle of the duct structure in a downward direction in an original position of the duct structure or of commanding the duct structure to move along the edge of the takeoff-and-landing deck to a predetermined position of the duct structure All operations (S310, S320, S330, and S340) of the present example may be executed by commands from the controller 320.

Methods according to the present disclosure may be implemented with program instructions that may be executed through various computer means, and may be recorded on a computer-readable medium. The computer-readable medium may include a program instruction, a data file, a data structure, etc., singly or in combination. The program instruction recorded on the computer-readable medium may be those specifically designed and configured for the present disclosure, or may be known and usable by those skilled in the art of computer software.

Examples of the computer-readable medium may include hardware devices specially configured to store and execute program instructions, such as an ROM, an RAM, a flash memory, etc. Examples of program instructions include a machine language code, such as that produced by a compiler, as well as a high-level language code that may be executed by a computer using an interpreter, etc. The above-described hardware device may be configured to operate with at least one software module to perform the operations of the present disclosure, and vice versa.

The wind power generation system 300 of the present example may include the storage unit 330. A recording medium suitable for storing the wind power generation method (S300) may include a magnetic medium such as a hard disk, a floppy disk, a magnetic tape, or the like, an optical medium such as a compact disk read only memory (CD-ROM), a digital video disk (DVD), or the like, a magneto-optical medium such as a floptical disk or the like, or a semiconductor memory such as a flash memory, an erasable programmable ROM (EPROM), an SSD manufactured based thereon, or the like.

The present disclosure may be implemented by a non-volatile memory (not illustrated), configured to store data relating to an algorithm configured to control operations of various components or a software instruction reproducing the algorithm, and a processor (not illustrated) configured to perform operations described above or below by using data stored in a memory. It. In this case, the memory and the processor may be implemented as individual chips. Alternatively, the memory and the processor may be implemented as a single chip integrated with each other. The processor may be provided as one or more processors.

Components for the wind power generation method (S300) may exchange information through a wired and wireless communication network. For example, data may be sent and received using network communication means provided in a vehicle, such as an ethernet, a media oriented systems transport (MOST), a flexray, a controller area network (CAN), a local interconnect network (LIN), an internet, LTE, 5G, Wi-Fi, Bluetooth, near field communication (NFC), a Zigbee, a radio frequency (RF), a low frequency (LF), or the like.

An aspect of the present disclosure is to provide a power generation system using a rotor of a mobility device taking off and landing at a stop therefor for wind power generation.

The purpose of the present disclosure is not limited to the purposes mentioned above, and other purposes not mentioned will be clearly understood by those skilled in the art from the description below.

According to an aspect of the present disclosure, a wind power generation structure for a vertiport includes a takeoff and landing deck; and a plurality of duct structures provided along an edge of the takeoff and landing deck, and individually having a wind turbine, respectively, wherein the plurality of duct structures are individually rotatable in a vertical direction.

Also, or alternatively, the takeoff and landing deck may be circular.

Also, or alternatively, the plurality of duct structures may be provided continuously along the edge of the takeoff and landing deck.

Also, or alternatively, the duct structure may include a body forming an exterior of the duct structure; and the wind turbine provided in a duct formed in the body, wherein the body may have a shape of which diameter increases in an outward direction.

Also, or alternatively, a ring-shaped structure surrounding the edge of the takeoff and landing deck may be implemented, when all the plurality of duct structures are aligned.

Also, or alternatively, the plurality of duct structures may be individually provided with adjustable rotation angles in the vertical direction.

In addition, the duct structure may include a body forming an exterior of the duct structure; the wind turbine provided in the body; and a rotation support rotatably supporting the body.

Also, or alternatively, a surface of the body facing the takeoff and landing deck may be rounded in a rotation direction.

Also, or alternatively, the plurality of duct structures may be provided to be movable along the edge of the takeoff and landing deck.

Also, or alternatively, the takeoff and landing deck may be circular.

In addition, a rotating rail may be provided on the edge of the takeoff and landing deck, and the plurality of duct structures may be provided to be individually movable along the edge of the takeoff and landing deck on the rotating rail.

According to an aspect of the present disclosure, a wind power generation method for a vertiport includes a preparation operation of sensing approach of a mobility device to a takeoff and landing deck in a vertical direction or whether a mobility device is ready for takeoff from a takeoff and landing deck in a vertical direction; an identification operation of identifying a type of the mobility device and a position of a rotor of the mobility device; and a power generation preparation operation of commanding a duct structure to rotate in an upward direction or a duct structure to move along an edge of the takeoff and landing deck, according to the position of the rotor of the mobility device.

Also, or alternatively, in the identification operation, the identification operation may receive coordinates regarding arrangement of each rotor from a center of the mobility device, and may calculate a position of each rotor.

In addition, the power generation preparation operation may command the duct structure to move to a position in which wind power generation can obtain maximum efficiency, according to the position of each rotor calculated in the identification operation, and to rotate in the upward direction after the movement.

In addition, the power generation preparation operation may command only the duct structure to rotate in a position in which wind power generation can obtain maximum efficiency according to the position of each rotor calculated in the identification operation.

In addition, the wind power generation method may further include, after the power generation preparation operation, when landing or takeoff of the mobility device is completed and wind power generation of the rotor is completed, a completion operation of commanding the duct structure to rotate in an original position of the duct structure or of commanding the duct structure to move to a predetermined position of the duct structure.

A wind power generation structure and a wind power generation method for a vertiport according to an example of the present disclosure may utilize a rotor of a mobility device taking off and landing at a mobility device stop for power generation by wind power.

In addition, an example of the present disclosure may provide a wind power generation structure and a wind power generation method for a vertiport in which a wind turbine may be exposed only during takeoff and landing of a mobility device, and may be used as a bridge or a walkway in normal times.

Effects of the present disclosure are not limited to those described above, and other effects not mentioned will be clearly recognized by those skilled in the art from the description above.

While examples have been illustrated and described above, it will be apparent to those skilled in the art that modifications and variations could be made without departing from the scope of the present disclosure as defined by the appended claims.

What is claimed is:

1. A structure comprising: a takeoff-and-landing deck; and a plurality of duct structures provided along an edge of the takeoff-and-landing deck, wherein each duct structure of the plurality of duct structures comprises a wind turbine of a plurality of wind turbines and each duct structure is rotatable in a first direction perpendicular to a top surface of the takeoff-and-landing deck, and wherein the plurality of duct structures are configured to align to form a ring-shape.

2. The structure of claim 1, wherein the takeoff-and-landing deck is circular.

3. The structure of claim 2, wherein the plurality of duct structures are provided continuously along the edge of the takeoff-and-landing deck.

4. The structure of claim 3, wherein each duct structure of the plurality of duct structures comprises a body having an exterior surface forming a duct in the body, wherein the wind turbine is provided in the duct and wherein the body has a width that increases outward from the takeoff-and-landing deck.

5. The structure of claim 4, wherein the plurality of duct structures are configured to surround the edge of the takeoff-and-landing deck.

6. The structure of claim 1, wherein each duct structure of the plurality of duct structures is independently rotatable.

7. The structure of claim 1, wherein each duct structure of the plurality of duct structures further comprises:
a body forming an exterior surface of the duct structure and
a support supporting the body and about which the body is configured to rotate.

8. The structure of claim 7, wherein each duct structure of the plurality of duct structures further comprises a surface that is configured to face the takeoff-and-landing deck and is rounded in the first direction.

9. The structure of claim 1, wherein the plurality of duct structures are movable along the edge of the takeoff-and-landing deck.

10. The structure of claim 9, wherein the takeoff-and-landing deck is circular.

11. A structure comprising:
a takeoff-and-landing deck; and
a plurality of duct structures provided along an edge of the takeoff-and-landing deck, wherein each duct structure of the plurality of duct structures comprises a wind turbine of a plurality of wind turbines and is rotatable in a first direction perpendicular to a top surface of the takeoff-and-landing deck,
wherein a rotating rail is provided on the edge of the takeoff-and-landing deck, and
wherein each duct structure of the plurality of duct structures is individually movable along the edge of the takeoff-and-landing deck on the rotating rail.

12. A structure comprising:
a plurality of duct structures;
at least one sensor; and
a controller comprising at least one processor and at least one memory,
wherein the at least one memory stores instructions that, when executed by the at least one processor, are configured to cause the structure to:
sense one or more of:
an approach of a mobility device to a takeoff-and-landing deck in a vertical direction, or
that a mobility device is ready for takeoff from the takeoff-and-landing deck in the vertical direction;
identify a type of the mobility device and a position of a rotor of the mobility device; and
control a position of a wind turbine of a duct structure, of the plurality of duct structures, at an edge of the takeoff-and-landing deck by controlling the duct structure to move, to a power generation position based on the position of the rotor, via one or more of:
rotating the duct structure in an upward direction, or
moving the duct structure along the edge of the takeoff-and-landing deck.

13. The structure of claim 12, wherein the instructions, when executed by the at least one processor, are configured to cause the structure to:
receive coordinates, relative to the mobility device, of each rotor of a plurality of rotors of the mobility device; and
determine, based on the coordinates and the type of the mobility device, a position of each rotor of the plurality of rotors.

14. The structure of claim 12, wherein the instructions, when executed by the at least one processor, are configured to cause the structure to:
control, based on determining that landing or takeoff of the mobility device is complete, the duct structure to return to an original position of the duct structure.

15. A method comprising:
sensing one or more of:
an approach of a mobility device to a takeoff-and-landing deck in a vertical direction, or
that a mobility device is ready for takeoff from the takeoff-and-landing deck in the vertical direction;
identifying a type of the mobility device and a position of a rotor of the mobility device; and
controlling a position of a wind turbine of a duct structure at an edge of the takeoff-and-landing deck by controlling the duct structure to move, to a power generation position based on the position of the rotor, via one or more of:
rotating the duct structure in an upward direction, or
moving the duct structure along the edge of the takeoff-and-landing deck.

16. The method of claim 15, further comprising receiving coordinates, relative to the mobility device, of each rotor of a plurality of rotors of the mobility device; and determining, based on the coordinates and the type of the mobility device, a position of each rotor of the plurality of rotors.

17. The method of claim 16, further comprising:

determining, based on the position of each rotor of the plurality of rotors, a target position configured to maximize efficiency of wind power generation, and controlling the duct structure to move to the target position and to rotate in the upward direction, wherein the target position is related to the duct structure that is rotated in the upward direction or moved along the edge of the takeoff-and-landing deck.

18. The method of claim 16, wherein the controlling the duct structure comprises controlling the duct structure to rotate in a position based on the position of each rotor.

19. The method of claim 15, further comprising:

controlling, based on determining that landing or takeoff of the mobility device is complete, the duct structure to return to an original position of the duct structure.

\* \* \* \* \*